(12) United States Patent
Cole et al.

(10) Patent No.: US 6,284,204 B1
(45) Date of Patent: Sep. 4, 2001

(54) OZONE GENERATOR

(75) Inventors: William L. Cole, Aldershot; Harold S. Coleman, Farnborough, both of (GB)

(73) Assignee: Ozone Industries Limited, Farnborough (GB)

( * ) Notice: Subject to any disclaimer, the term of this patent is extended or adjusted under 35 U.S.C. 154(b) by 0 days.

(21) Appl. No.: 09/557,781

(22) Filed: Apr. 26, 2000

(30) Foreign Application Priority Data

May 28, 1999 (GB) .................................................. 9912503

(51) Int. Cl.$^7$ ....................................................... B01J 19/08
(52) U.S. Cl. ....................................................... 422/186.07
(58) Field of Search ........................................ 422/186.07

(56) References Cited

U.S. PATENT DOCUMENTS 5,211,919  5/1993  Conrad .
5,525,310  6/1996  Decker et al. .

FOREIGN PATENT DOCUMENTS

A 2 318 490   4/1998   (GB) .
12-42405      9/1989   (JP) .

*Primary Examiner*—Kathryn Gorgos
*Assistant Examiner*—Thao Tran
(74) *Attorney, Agent, or Firm*—Oliff & Berridge, PLC

(57) ABSTRACT

An ozone generating cell includes at least two substantially planar electrodes at a potential difference separated by a dielectric sheet, each producing a corona discharge to convert a proportion of any oxygen present to ozone. The electrodes, when considered in plan, are generally offset with regions of the electrodes overlapping or almost overlapping each other, and regions of both electrodes not overlapping each other. One or both planar electrode may feature extending planar portions of a substantially rectangular 'U' shape.

6 Claims, 2 Drawing Sheets

OZONE GENERATOR

FIELD OF THE INVENTION

The present invention relates to ozone generators, in particular their electrodes.

BACKGROUND OF THE INVENTION

Ozone is an allotrope of oxygen, comprising a molecule of three oxygen atoms. It is highly unstable and a strong oxidant, which makes it a useful disinfectant and deodorant, as it spontaneously oxidizes many compounds.

Conventionally, oxygen-containing gas is fed through a generating cell containing two electrodes separated at a high voltage, whereupon a proportion of the diatomic oxygen is converted to ozone. One or more such generating cells are usually disposed in a housing to make an ozone generator. The ozone containing air is then directed to the area to be treated.

A known ozone generating cell has a glass tube, provided with an inner coating of aluminum. Concentrically surrounding the glass tube, but separated somewhat by spacers, is a stainless steel tube. The aluminum coating is connected to a high voltage supply, whilst the steel tube is earthed.

Oxygen-containing gas is passed between the tubes, and some of the oxygen molecules are converted to ozone by the high voltage discharge between the electrodes.

Though usually clad in a water jacket, the heat generated by the discharge makes the glass prone to failure.

A similar known generator has a mirror coating upon the glass tube (or the tube may be ceramic), and is surrounded by a stainless steel mesh. Again, the tube may overheat, this being aggravated by the insulating qualities of the mirror surface and the uneven field produced by the steel mesh.

GB 2318490 shows a pair of electrodes either side of a dielectric, one electrode being in the form of a sheet, whilst the opposing electrode features one or more extending thin flat wires. Whilst effective in producing ozone, the thin flat wires are fragile and difficult to apply. They may be applied as a conductive ink, though this process is inconvenient, and the resulting arrangement is still delicate.

The object of the present invention is to enable ozone to be produced in an efficient manner, going at least some way towards alleviating the problems associated with prior art ozone generating cells.

SUMMARY OF THE INVENTION

According to the present invention there is provided an ozone generating cell including at least two substantially planar electrodes at a potential difference separated by a dielectric sheet, each of the electrodes producing a corona discharge or the like capable of converting a proportion of any oxygen present to ozone, wherein the electrodes, when considered in plan, are generally offset with regions of the electrodes overlapping or almost overlapping each other, and regions of both electrodes not overlapping each other.

Preferably, one or both planar electrode features extending planar portions. Preferably both electrodes feature extending planar portions. Preferably the planar shape is a substantially rectangular 'U' shape.

Also provided according to the present invention is an ozone generator using one or more ozone generating cells as defined above, and a method of producing ozone using one or more ozone generating cells as defined above.

BRIEF DESCRIPTION OF THE DRAWINGS

The invention will now be described, by examples which are not intended to be limiting, with reference to the drawings, of which.

DESCRIPTION OF THE PREFERRED EMBODIMENT

Figure 1:
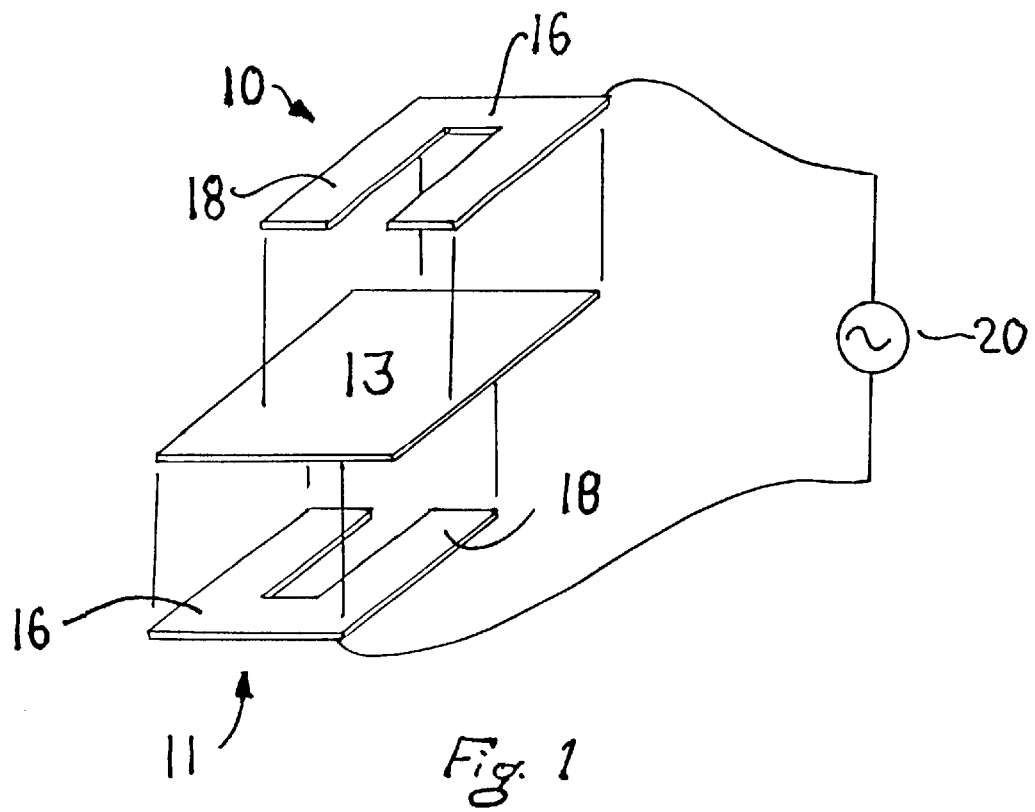
FIG. 1 is an exploded perspective view of the ozone generating cell.
Figure 2:
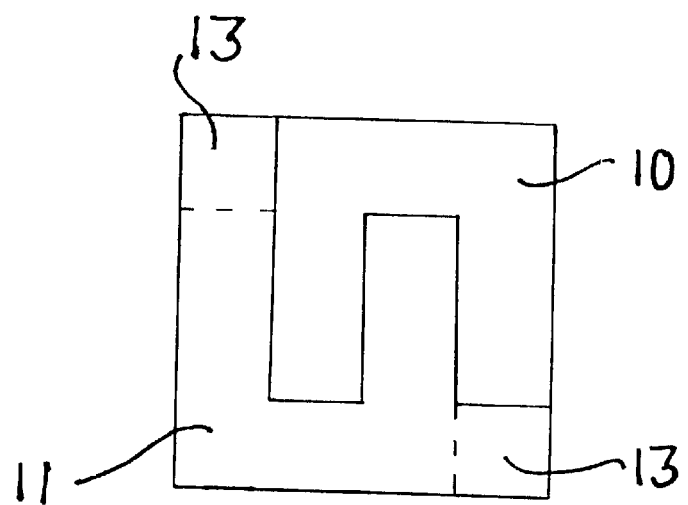
FIG. 2 is a plan view of the ozone generating cell.

Referring to FIG. 1, the generating cell comprises two similar stainless steel electrodes 10,11, one bonded to each side of an alumina wafer 13. Each electrode is a planar rectangular 'U' shape, that is, it has two parallel rectangular fingers 18 extending from a rectangular waist 16, and each electrode is cut from stainless steel strip. The width of one of the fingers is equal to the width of the gap separating the fingers. The electrodes are disposed so that one finger of each of the to electrodes interlocks with the gap occurring between the other electrodes fingers, when the electrodes are considered in plan, as shown in FIG. 2. It can be seen that the alumina wafer is at least the four times the width of a single electrode finger, and the length of a finger and two waist portions. It can also be seen that two corner portions of the wafer have no portion of the electrodes either above or below.

The electrodes are typically about 30 mm long, and the width of a finger is approximately 4 mm wide. The end of the fingers on the electrodes may include bridging portions linking the fingers, so that the electrode has greater rigidity, especially whilst the electrode is being mounted upon the dielectric.

The two electrodes are connected via terminals to a high voltage alternating supply 20. When a high voltage is applied across the two electrodes in the presence of oxygen-containing gas, a corona discharge between the electrodes causes the formation of ozone. Discharge will occur around both the electrodes, so that ozone will be formed on both sides of the cell.

The areas of the two electrodes may overlap to some extent. The discharge occurs specifically principally at the edge regions of each electrode where the electrodes are nearly or actually overlapping, when considered in plan.

Considering two sheet electrodes separated by a dielectric, so that, in plan, two edges are approximately coincident, it is found that ozone production is optimal when the two edges are coincident, and falls when the electrodes begin to overlap or are separated. Ozone production decreases more sharply when the electrodes are separated than when they increasingly overlap, so a slight overlap is preferably to a non-overlapping.

Such coincident electrode pairs have the discharge characteristics of long thin electrodes in terms of producing ozone, but are stronger and more convenient to apply than equivalent long thin electrodes applied either as thin strips of foil or as a conductive ink.

Figure 3:
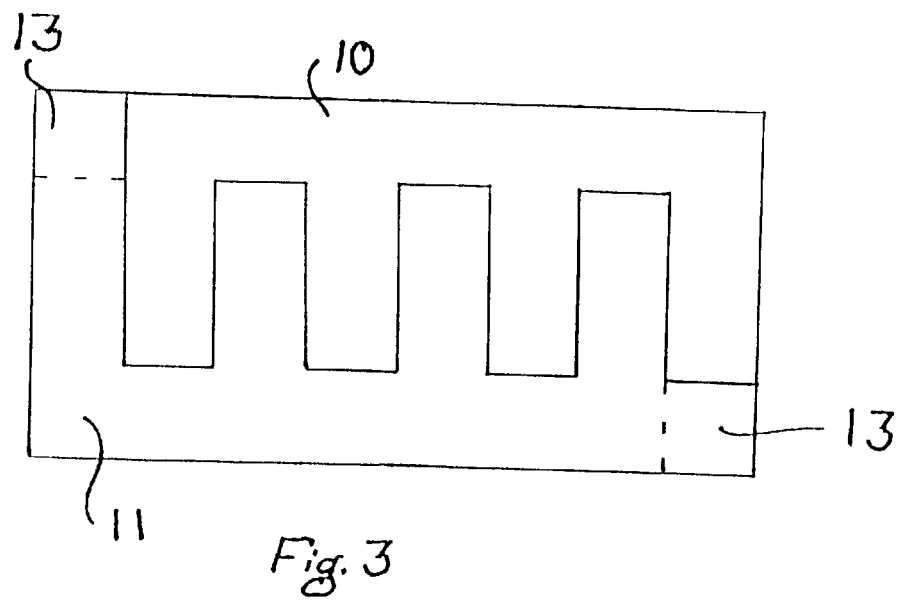
FIG. 3 is a plan view of another embodiment.

The interlocking principle may be extended to two similar 10,11 electrodes upon a wafer 13, each electrode having a large number of fingers to create a greater quantity of ozone as shown in FIG. 3. The increased length of the coincident edges increases the amount of ozone produced.

Since the discharge may produce a significant increase in temperature, the adhesive bonding them to the wafer should be elastic enough to accommodate the different rates of expansion of the electrodes and the alumina wafer, and yet resistant to high temperatures and ozone corrosion A fan directs air over both sides of the cell, cooling it and carrying off the ozone produced by each electrode.

Figure 4:
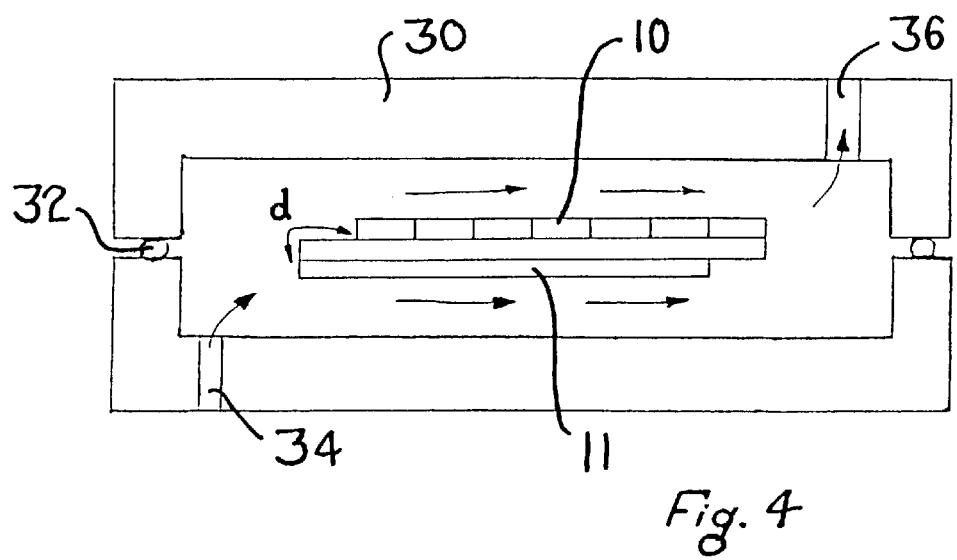
FIG. 4 is a sectional side elevation of an ozone generator

Alternatively, such a generating cell may be disposed within a housing to form an ozone generator, ideally with some fan means or the like to supply the generating cell with air and to direct the ozone-containing air to where it is needed. FIG. 4 shows a generating cell located in a chamber 30, the chamber being made up of two halves joined by an O-ring 32. Air is directed by fan means (not here shown) into inlet vent 34, and circulates around the generating cell 25, so that part of the air passes over the upper electrode 10, and part of the air passes over the lower electrode 1. The ozone containing air then exits the chamber through the outlet vent 36.

It will be noticed that the electrodes do not overlap at the edges of the alumina wafer, but that each, when considered in plan, is offset from the other. The distance (indicated by the double headed arrow 'd' in FIG. 4), over the surface of the alumina wafer, between the electrodes must be at least 5 mm in order to prevent surface tracking. That is, at shorter distances a conductive path over the surface of the alumina between the electrodes may be formed, causing a short circuit. The regions 13 in FIGS. 2 and 3 must for this reason be left unoccupied by either electrode. If it is desired to extend the electrodes to these regions, or to have the electrodes generally superimposed rather than offset, then the alumina wafer may be extended outwards to increase the surface distance between the electrodes.

The generating cells may equally be disposed in other types of ozone generator than that illustrated here, for example for use in 'wet' applications where the ozone produced is used to treat water.

It will be realized that many shapes cut from conducting strip can be used in such an application, and many conducting materials are suitable for use as electrodes. The electrodes need not even be formed from pieces of conducting strip, but could be formed from mesh, wire, or deposition directly onto both sides of the dielectric layer. Indeed many dielectric materials, such as metal oxides, glass or ceramics, may equally be used for the dielectric sheet.

Alternative embodiments using the principles disclosed will suggest themselves to those skilled in the art, and it is intended that such alternatives are included within the scope of the invention, the scope of the invention being limited only by the claims.

What is claimed is:

1. An ozone generating cell including at least first and second substantially planar electrodes at a potential difference separated by a dielectric sheet, each of the first and second electrodes producing a corona discharge capable of converting a proportion of any oxygen present to ozone, wherein the electrodes, when considered in plan, are generally offset with regions of the electrodes overlapping or almost overlapping each other, and regions of both electrodes, in the form of extending planar portions, not overlapping each other, wherein the matching edges of the corresponding non-overlapping extending portions of the first and second electrodes are approximately coincident.

2. An ozone generating cell according to claim 1, wherein one planar electrode features extending planar portions.

3. An ozone generating cell according to claim 1, wherein both electrodes feature extending planar portions.

4. An ozone generating cell according to claim 1, wherein the planar shape is a substantially rectangular 'U' shape.

5. An ozone generator using one or more ozone generating cells according to claim 1.

6. A method of producing ozone using one or more ozone generating cells according to claim 1.

* * * * *